United States Patent [19]
Han

[11] Patent Number: 6,031,872
[45] Date of Patent: Feb. 29, 2000

[54] METHOD AND APPARATUS FOR ENCODING A VIDEO SIGNAL

[75] Inventor: Seok-Won Han, Seoul, Rep. of Korea

[73] Assignee: Daewoo Electronics Co., Ltd., Seoul, Rep. of Korea

[21] Appl. No.: 09/097,740

[22] Filed: Jun. 16, 1998

[51] Int. Cl.[7] .................................................. H04N 7/12
[52] U.S. Cl. ..................... 375/240; 348/420; 348/415; 382/243
[58] Field of Search ..................... 382/203, 232, 382/233, 234, 235, 236, 238, 239, 242, 243, 248, 249, 250; 348/420, 419, 416, 421, 446, 448, 405, 403, 415; H04B 1/66; H04N 7/12

[56] References Cited

U.S. PATENT DOCUMENTS

| | | | |
|---|---|---|---|
| 5,500,678 | 3/1996 | Puri | 348/408 |
| 5,748,789 | 5/1998 | Lee et al. | 382/243 |
| 5,757,971 | 5/1998 | Kim | 382/242 |
| 5,790,196 | 8/1998 | Sun et al. | 348/419 |
| 5,825,421 | 10/1998 | Tan | 348/415 |
| 5,946,043 | 8/1999 | Lee et al. | 348/420 |
| 5,973,743 | 10/1999 | Han | 348/416 |

FOREIGN PATENT DOCUMENTS

0831658  3/1998  European Pat. Off. .

*Primary Examiner*—Richard Lee
*Assistant Examiner*—Gims Philippe
*Attorney, Agent, or Firm*—Pennie & Edmonds LLP

[57] ABSTRACT

A video signal encoder codes texture information of a video signal which includes the texture information and shape information on each of macroblocks. The encoder generates a predicted coded block pattern type (CBPY) bit-number based on the shape information on a target macroblock. In the meantime, a DCT_type of the target macroblock is determined based on the texture information on the target macroblock, wherein the DCT_type represents a more effective coding technique between a progressive and an interlaced coding techniques for encoding the texture information, thereby producing DCT_type information representing the DCT_type. In response to the DCT_type, the texture information on the target macroblock is transformed and CBPY information for the target macroblock is generated based on the transformed texture information. Then, the CBPY information is encoded by using the predicted CBPY bit-number and the transformed texture information is encoded to thereby produce encoded texture information.

15 Claims, 8 Drawing Sheets

| ENCODED SHAPE INFORMATION | ... | ENCODED CBPY INFORMATION | ... | DCT_TYPE INFORMATION | ... | ENCODED TEXTURE INFORMATION |

FIG.6A

| CODE | CBPY(I) | CBPY(P) |
|------|---------|---------|
| 111  | 00      | 11      |
| 110  | 01      | 10      |
| 10   | 10      | 01      |
| 0    | 11      | 00      |

FIG.6B

| CODE  | CBPY(I) | CBPY(P) |
|-------|---------|---------|
| 100   | 000     | 111     |
| 11111 | 001     | 110     |
| 11110 | 010     | 101     |
| 101   | 011     | 100     |
| 11101 | 100     | 011     |
| 11100 | 101     | 010     |
| 110   | 110     | 001     |
| 0     | 111     | 000     |

FIG. 6C

| CODE | CBPY(I) | CBPY(P) |
|---|---|---|
| 0011 | 00 00 | 11 11 |
| 0010 1 | 00 01 | 11 10 |
| 0010 0 | 00 10 | 11 01 |
| 1001 | 00 11 | 11 00 |
| 0001 1 | 01 00 | 10 11 |
| 0111 | 01 01 | 10 10 |
| 0000 10 | 01 10 | 10 01 |
| 1011 | 01 11 | 10 00 |
| 0001 0 | 10 00 | 01 11 |
| 0000 11 | 10 01 | 01 10 |
| 0101 | 10 10 | 01 01 |
| 1010 | 10 11 | 01 00 |
| 0100 | 11 00 | 00 11 |
| 1000 | 11 01 | 00 10 |
| 0110 | 11 10 | 00 01 |
| 11 | 11 11 | 00 00 |

METHOD AND APPARATUS FOR ENCODING A VIDEO SIGNAL

FIELD OF THE INVENTION

The present invention relates to a method and an apparatus for coding a video signal; and, more particularly, to a method and an apparatus for effectively encoding texture information of the video signal by representing a coding condition of the texture information based on the texture information and its corresponding shape information.

DESCRIPTION OF THE PRIOR ART

In digital video systems such as video-telephone and teleconference systems, a large amount of digital data is needed to define each video signal since the video signal comprises a sequence of digital data referred to as pixel values. Since, however, the available frequency bandwidth of a conventional transmission channel is limited, in order to transmit the substantial amount of digital data therethrough, it is necessary to compress or reduce the volume of data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique wherein an input video image is divided into objects and three sets of parameters for defining the motion, contour and pixel data of each object are processed through different encoding channels.

One example of such object-oriented coding schemes is the so-called MPEG (Moving Picture Experts Group) phase 4 (MPEG-4), which is designed to provide an audio-visual coding standard for allowing a content-based interactivity, improved coding efficiency and/or universal accessibility in such applications as low bit-rate communication, interactive multimedia(e.g., games, interactive TV, etc.) and area surveillance(see, for instance, *MPEG-4 Video Verification Model Version 7.0*, International Organization for Standardization, Coding of Moving Pictures and Associated Audio Information, ISO/IEC JTC1/SC29/WG11 MPEG97/N1642, Bristol, April 1997).

According to MPEG-4, an input video image is divided into a plurality of video object planes(VOP's), which correspond to entities in a bitstream that a user can access and manipulate. A VOP can be represented by a bounding rectangle whose width and height may be the smallest multiples of 16 pixels (a macroblock size) surrounding each object so that the encoder processes the input video image on a VOP-by-VOP basis.

A VOP disclosed in MPEG-4 includes shape information and texture information for an object therein which are represented by a plurality of macroblocks on the VOP, each of the macroblocks having, e.g., 16×16 pixels. Each of the macroblocks on the VOP can be classified into one of a background, a boundary and an object macroblocks. The background macroblock contains only background pixels located outside an object in the VOP; the boundary macroblock includes at least one background pixel and at least one object pixel located inside the object; and the object macroblock has only object pixels. The shape information may be encoded by using a conventional bit-map-based shape coding method such as a context-based arithmetic encoding(CAE) technique on a macroblock basis and the texture information is encoded through the use of conventional encoding techniques such as DCT(discrete cosine transform), quantization and VLC (variable length coding) techniques on the macroblock basis. Specifically, the DCT process for transforming the texture information is performed on a DCT-block basis, wherein a macroblock is divided into 4 DCT-blocks of 8×8 pixels.

From the DCT and the quantization processes, one DC component and a multiplicity of AC components are produced for each DCT-block. However, for example, if all values of texture information for a DCT-block are constant, there is no corresponding non-zero AC component for the DCT-block. Therefore, CBPY(coded block pattern type) information has been proposed to represent whether a DCT-block has at least one corresponding non-zero AC component. Specifically, if there exists at least one non-zero AC component corresponding to a DCT-block, the CBPY information contains a bit of, e.g., "1", and, if otherwise, a bit of, e.g., "0". Accordingly, a decoding part can tell the existence of non-zero AC components for a corresponding DCT-block by simply detecting the CBPY information transmitted thereto through a transmission channel without any further information for the corresponding DCT-block and before encoded texture information for the corresponding DCT-block is transmitted thereto.

Conventionally, in order to encode the texture information for the VOP, the texture information on each of the macroblocks is processed by adaptively using a progressive and an interlaced coding techniques to thereby enhance the coding efficiency. Therefore, DCT_type information representing a coding condition, i.e., a DCT_type, of the texture information is employed and the DCT_type is determined on the macroblock basis using the texture information. For example, a video signal encoder determines an appropriate DCT_type for a macroblock by comparing a spatial correlation between pixel rows in the macroblock which are re-formed to a progressive or an interlaced type macroblock according to the progressive or the interlaced coding technique. If the progressive coding technique is determined to be more effective, the DCT_type information on the macroblock will have a bit of, e.g., "0", and, if otherwise, a bit of, e.g., "1".

After the DCT_type for a macroblock is determined based on the texture information, the CBPY information on the macroblock is obtained from quantized DCT results which are derived by performing the DCT and the quantization processes for the texture information on the macroblock in the determined DCT_type thereof.

For instance, if a macroblock is a background macroblock, its texture information is not encoded and, therefore, its DCT_type and CBPY information are not generated.

If the macroblock is an object macroblock, either the progressive or the interlaced coding technique can be selected based on the texture information on the macroblock and, therefore, the DCT_type information of the object macroblock representing the selected coding technique is produced. Also, the CBPY information of the object macroblock will have 4-bit data, the respective bits corresponding to the respective 4 DCT-blocks within the macroblock, since the object macroblock has 4 non-transparent DCT-blocks, wherein each non-transparent DCT-block has a DCT-block size and contains at least one object pixel to be encoded.

On the other hand, if the macroblock is a boundary macroblock, either the progressive or the interlaced coding technique is also chosen based on the texture information on the macroblock. In addition, the boundary macroblock can include both a transparent DCT-block and a non-transparent DCT-block together, wherein the transparent DCT-block has only background pixels therein and need not be encoded. Consequently, the CBPY information corresponding to the boundary macroblock may have i-bit data, i being a positive integer ranging from 1 to 4, and the respective bits corresponding to the respective non-transparent DCT-blocks in the macroblock.

Figure 4A:
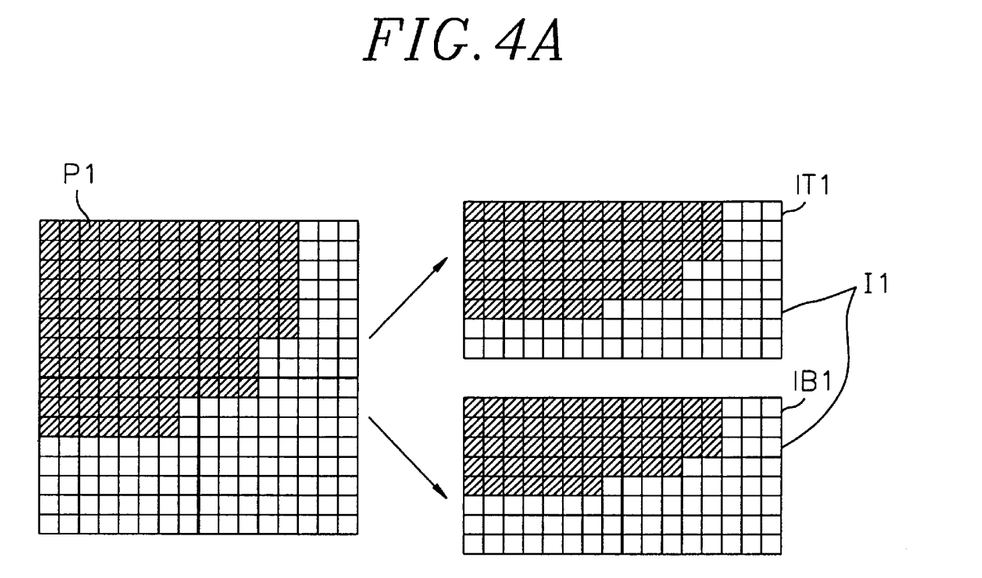
FIGS. 4A to 4C describe examples of boundary macroblocks which are classified into two different types, respectively.
Figure 4B:
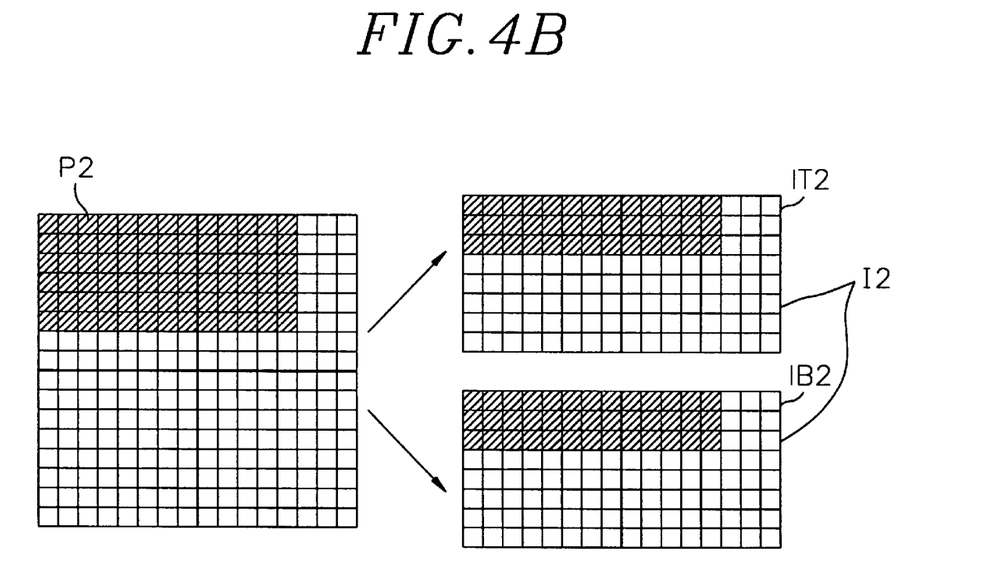
Figure 4C:
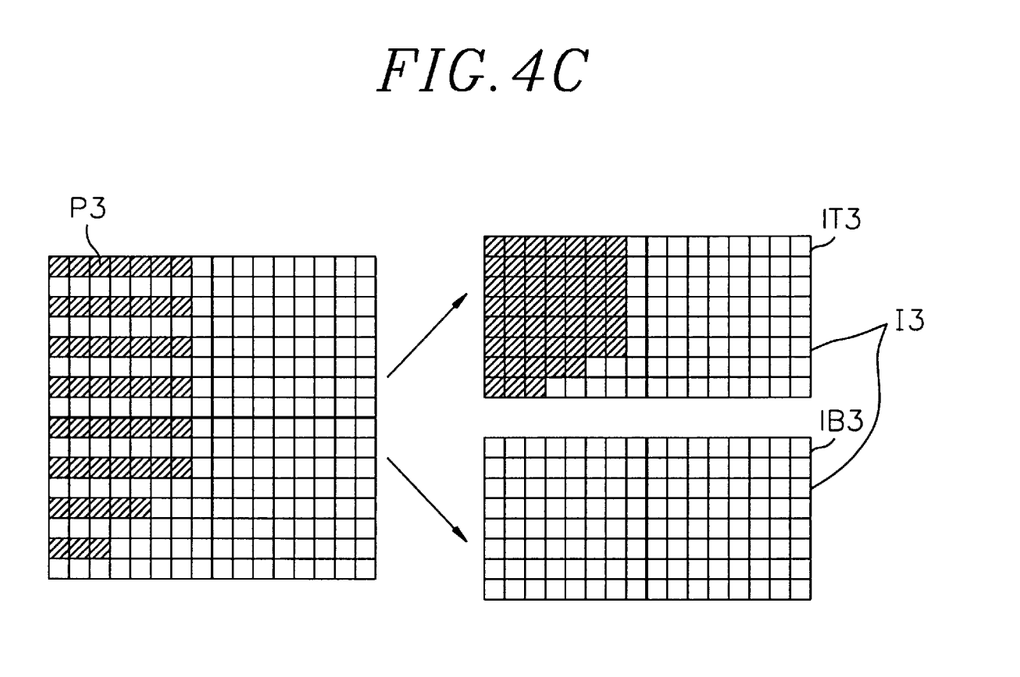

Referring to FIGS. 4A to 4C, there are provided various examples of boundary macroblocks which are classified into two different types, i.e., a progressive and an interlaced type macroblocks. In the drawings, macroblocks P1 to P3, which represent progressive type macroblocks, respectively, are re-formed to interlaced type macroblocks I1 to I3 including top- and bottom-field DCT-blocks IT1 and IB1 to IT3 and IB3, respectively. Therefore, in the progressive coding technique, the macroblock is encoded based on the progressive type macroblock while it is encoded by using the interlaced type macroblock including the top- and bottom-field DCT-blocks in the interlaced coding technique.

As can be seen in FIG. 4A, since both the progressive type macroblock P1 and its interlaced type macroblock I1 contain only non-transparent DCT-blocks, the corresponding CBPY information has 4-bit data regardless of the DCT_type of the macroblock.

However, in FIGS. 4B and 4C, the numbers of non-transparent DCT-blocks within a progressive and an interlaced type macroblocks are different from each other depending on their DCT_types. Consequently, the bit-number of the CBPY information varies according to the DCT_type. To be more specific, in FIG. 4B, if the progressive type macroblock P2 is selected to be encoded, 2-bit CBPY information is generated and, if otherwise, 4-bit CBPY information is produced. In FIG. 4C, if the progressive type macroblock P3 is chosen to be encoded, 2-bit CBPY information is generated and, if otherwise, 1-bit CBPY information is produced.

As can be noted from the above, if a macroblock to be processed is a boundary macroblock, the bit-number of the CBPY information, i.e., the number of non-transparent DCT-blocks therein, is determined depending on its DCT_type.

Figure 5:
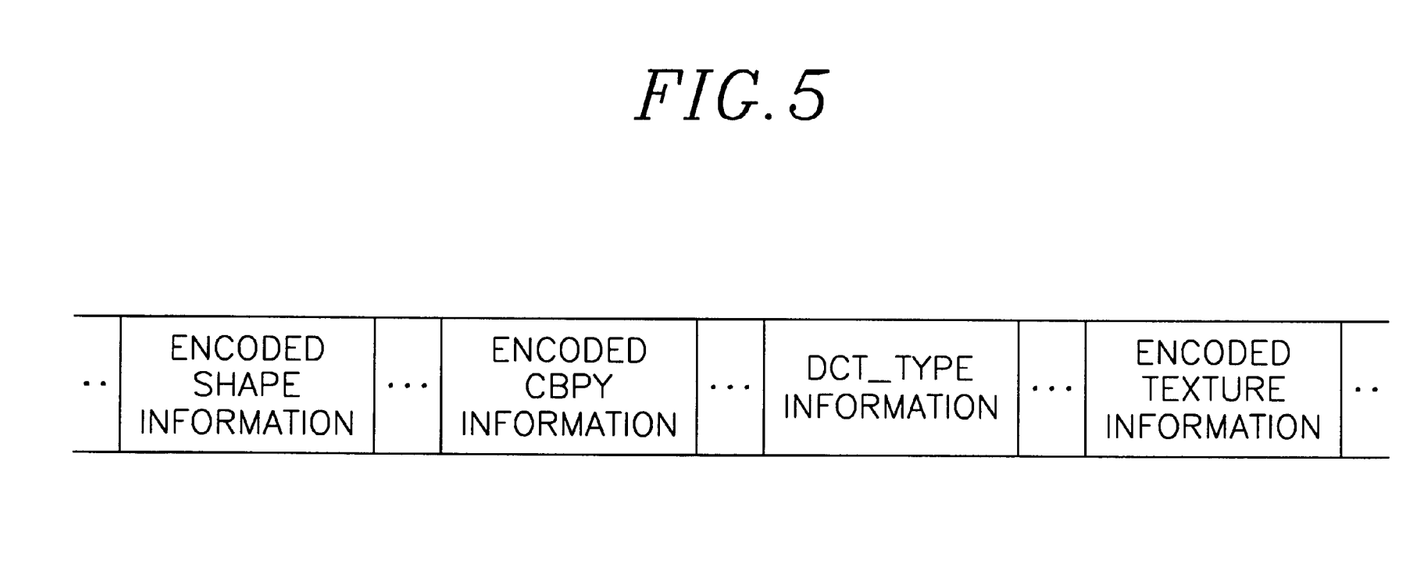
FIG. 5 shows a sequence of a data stream to be transmitted to a decoding part.

However, in the above conventional encoding method employing the CBPY and the DCT_type information, a data stream to be transmitted to the decoding part normally has a sequence as shown in FIG. 5. Namely, encoded shape information is transmitted first to the decoding part and the other encoded information follows the encoded shape information in the order of CBPY, DCT_type and texture information.

Therefore, when the decoding part receives the encoded information in the above sequence and a processed macroblock is a boundary macroblock, the decoding part may not correctly predict the bit-number of the CBPY information, i.e., the number of non-transparent DCT-blocks within the processed macroblock and, consequently, may not accurately reconstruct the CBPY information since the CBPY information has been determined depending on the DCT_type information which is transmitted to the decoding part after the encoded CBPY information.

SUMMARY OF THE INVENTION

It is, therefore, a primary object of the invention to provide a method and an apparatus, for use in a video signal encoder, for producing CBPY information whose bit-number is determined based on shape information of a video signal.

In accordance with one aspect of the present invention, there is provided a method, for use in a video signal encoder, for coding texture information of a video signal which includes the texture information and shape information on each of macroblocks, each macroblock having M×M pixels and being dividable into P number of equal-sized DCT-blocks, M and P being positive integers, respectively, comprising the steps of: (a) generating a predicted CBPY bit-number based on the shape information on a target macroblock; (b) determining a DCT_type of the target macroblock based on the texture information on the target macroblock, wherein the DCT_type represents a more effective coding technique between a progressive and an interlaced coding techniques for encoding the texture information, thereby producing DCT_type information representing the DCT_type; (c) converting the texture information on the target macroblock in response to the DCT_type to thereby produce transformed texture information; (d) producing CBPY information for the target macroblock based on the transformed texture information; (e) encoding the CBPY information by using the predicted CBPY bit-number to thereby provide encoded CBPY information; and (f) encoding the transformed texture information to thereby supply encoded texture information.

In accordance with another aspect of the present invention, there is provided an apparatus for coding a video signal which includes texture information and shape information on each of macroblocks, each macroblock having M×M pixels and being dividable into P number of equal-sized DCT-blocks, M and P being positive integers, respectively, comprising: a shape encoding unit for producing encoded shape information by encoding the shape information on a target macroblock and generating reconstructed shape information by decoding the encoded shape information; a CBPY bit-number prediction unit for generating a predicted CBPY bit-number based on the reconstructed shape information on the target macroblock; a DCT_type determination unit for determining a DCT_type of the target macroblock based on the texture information on the target macroblock, wherein the DCT_type represents a more effective coding technique between a progressive and an interlaced coding techniques for encoding the texture information, thereby producing DCT_type information representing the DCT_type; a transformation unit for converting the texture information on the target macroblock in response to the DCT_type to thereby produce transformed texture information; a CBPY generation unit for producing CBPY information for the target macroblock based on the transformed texture information; a CBPY encoding unit for encoding the CBPY information by using the predicted CBPY bit-number to thereby provide encoded CBPY information; and a texture encoding unit for encoding the transformed texture information to thereby supply encoded texture information.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

A video signal includes shape information and texture information on a plurality of macroblocks therein and, the texture information is adaptively encoded on a macroblock basis through the use of either a progressive or an interlaced coding technique. Each of the macroblocks has M×M, e.g., 16×16, pixels and can be divided into, e.g., 4 DCT-blocks having a same number of pixels, e.g., 8×8 pixels, M being a positive integer. An appropriate coding technique, i.e., either the progressive or the interlaced coding technique, for each of the macroblocks is determined based on the texture information thereon as shown in the conventional coding method.

Figure 1:
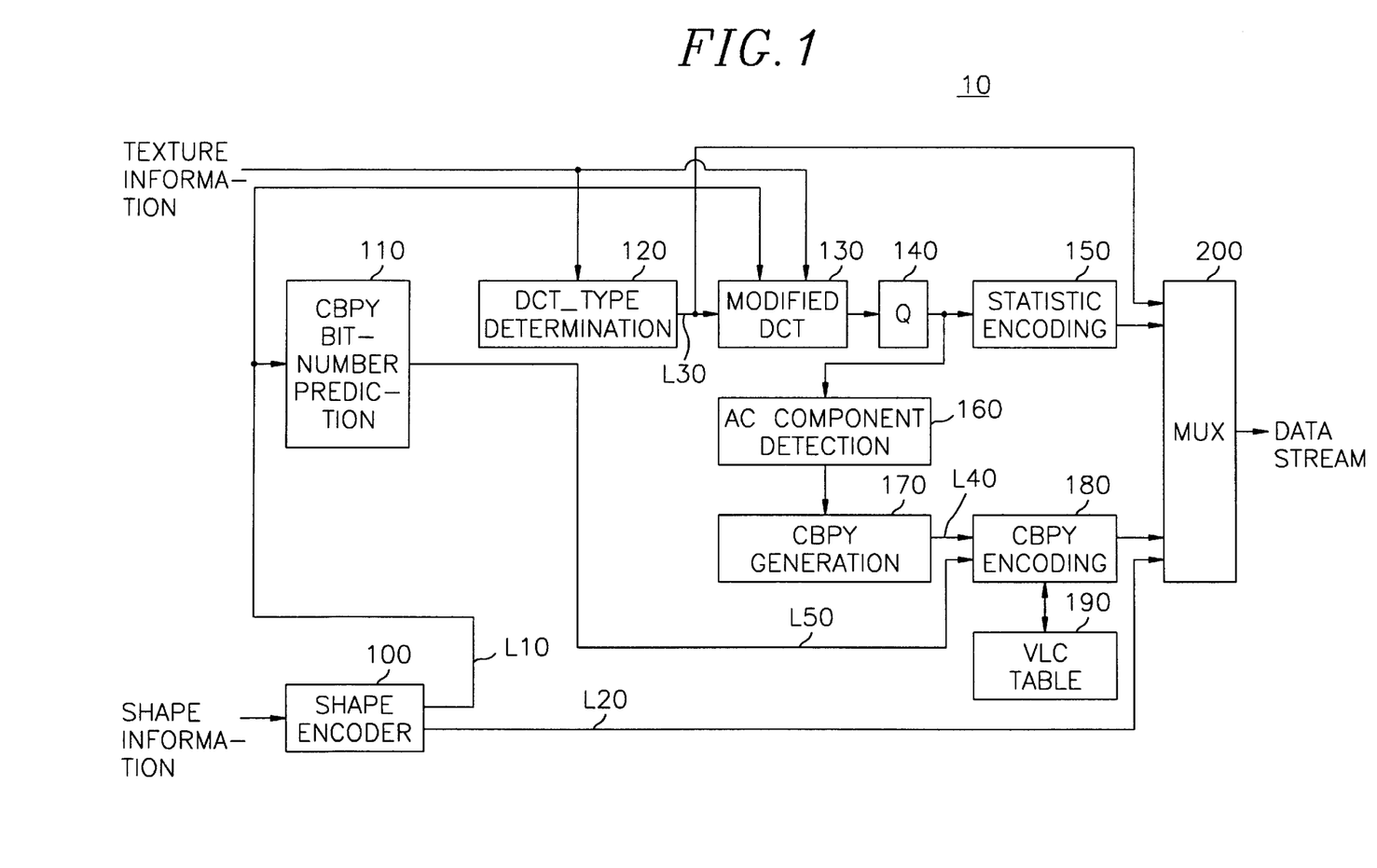
FIG. 1 is a block diagram of a video signal encoder in accordance with the present invention.

Referring to FIG. 1, there is provided a block diagram of a video signal encoder 10 in accordance with an embodiment of the present invention.

Texture information on a processing macroblock is inputted to a DCT_type determination unit 120 and a modified DCT unit 130 in parallel and its corresponding shape information is coupled to a shape encoder 100.

The shape encoder 100 encodes the shape information by using a known shape coding method, e.g., the CAE technique disclosed in MPEG-4 supra, to thereby generate encoded shape information and provide the encoded shape information to a multiplexor(MUX) 200 via a line L20. The shape encoder 100 also provides reconstructed shape information on the processing macroblock, which is generated by decoding the encoded shape information, to a CBPY bit-number prediction unit 110 and the modified DCT unit 130 via a line L10 in parallel.

The CBPY bit-number prediction unit 110 first re-forms the reconstructed shape information on the processing macroblock into a progressive and an interlaced type macroblocks according to the progressive and the interlaced coding techniques as exemplarily shown in FIGS. 4A to 4C, wherein the progressive type macroblock is identical to the processing macroblock. Then, the CBPY bit-number prediction unit 110 calculates the numbers of non-transparent DCT-blocks in the progressive and the interlaced type macroblocks, wherein each non-transparent DCT-block has a DCT-block size and contains at least one object pixel therein.

For example, in FIG. 4A, the numbers of non-transparent DCT-blocks in the progressive and the interlaced type macroblocks P1 and I1 are identical to each other, e.g., 4. In FIG. 4B, the number of non-transparent DCT-blocks in the progressive type macroblock P2 is 2 while that of non-transparent DCT-blocks in the interlaced type macroblock I2 is 4. In FIG. 4C, the number of non-transparent DCT-blocks in the progressive type macroblock P3 is 2 while that of non-transparent DCT-blocks in the interlaced type macroblock I3 is 1.

After the numbers of the non-transparent DCT-blocks in the progressive and the interlaced type macroblocks are computed, the CBPY bit-number prediction unit 110 compares the numbers of the non-transparent DCT-blocks in the progressive and the interlaced type macroblocks with each other.

As a result of the comparison process, if the numbers of non-transparent DCT-blocks in the progressive and the interlaced type macroblocks are different from each other as described in FIGS. 4B and 4C, the CBPY bit-number prediction unit 110 decides a larger number as a predicted CBPY bit-number and provides the predicted CBPY bit-number to a CBPY encoding unit 180 via a line L50. Therefore, in FIG. 4B, the number of the non-transparent DCT-blocks, i.e., 4, in the interlaced type macroblock I2 is determined as the predicted CBPY bit-number and, similarly, that of the non-transparent DCT-blocks, i.e., 2, in the progressive type macroblock P3 is decided in FIG. 4C.

On the other hand, if the numbers of the non-transparent DCT-blocks in the progressive and the interlaced type macroblocks are non-zero and identical to each other as shown in FIG. 4A, the CBPY bit-number prediction unit 110 supplies the identical number, i.e., 4, as the predicted CBPY bit-number to the CBPY encoding unit 180 through the line L50.

In the above, if the numbers of the non-transparent DCT-blocks in the progressive and the interlaced type macroblocks are zero, it represents that the processing macroblock is a background macroblock which contains only background pixels therein. Therefore, the CBPY bit-number prediction unit 110 does not transfer any data to the CBPY encoding unit 180.

In the meantime, the DCT_type determination unit 120 decides a DCT_type of the processing macroblock by using a known DCT_type determination method based only on the texture information, wherein the DCT_type represents a more effective coding technique between the progressive and the interlaced coding techniques for encoding the texture information. Then, the DCT_type determination unit 120 supplies DCT_type information representing the DCT_type of the processing macroblock to the MUX 200 and the modified DCT unit 130 via a line L30.

In the above process of determining the DCT_type of the processing macroblock, if it is found out that the processing macroblock is the background macroblock, the DCT_type determination unit 120 provides a DCT disable signal only to the modified DCT unit 130.

If the DCT_type information on the processing macroblock is fed thereto, the modified DCT unit 130 produces a set of DCT coefficients for a non-transparent DCT-block by performing a conventional DCT method based on the texture and the reconstructed shape information on the processing macroblock. On the other hand, if the DCT disable signal is inputted thereto, the modified DCT unit 130 does not perform any process and no output is provided.

In contrast, in a conventional coding method, if the processing macroblock is determined as the background macroblock, the video signal encoder 10 does not perform any process for the background macroblock since its corresponding texture information is not coupled to the video signal encoder 10.

Figure 2:
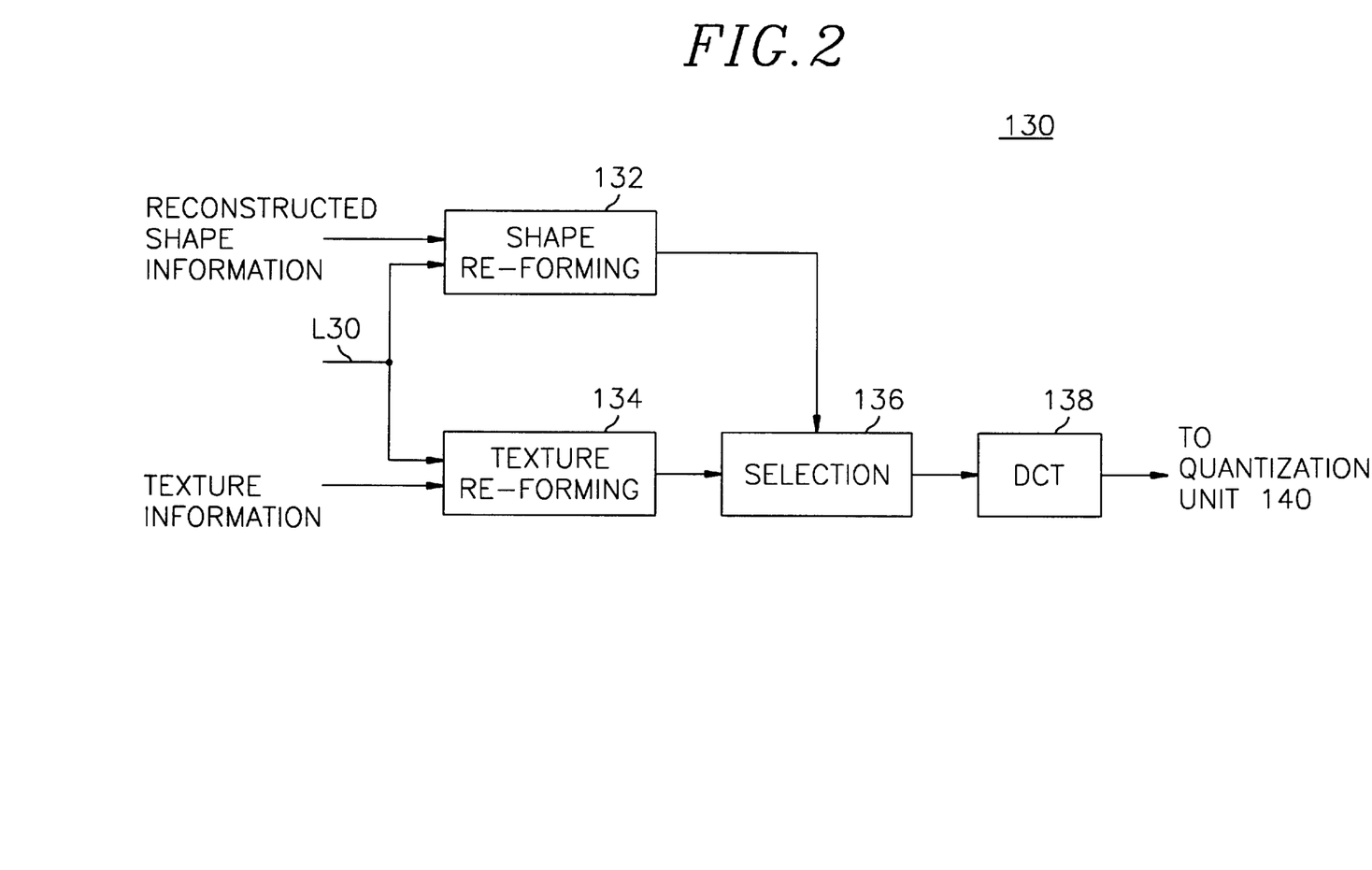
FIG. 2 presents a detailed block diagram of the modified DCT unit 130 in FIG. 1.

In accordance with the embodiment of the present invention, referring to FIG. 2, there is provided a detailed block diagram of the modified DCT unit 130 including a shape re-forming sector 132, a texture re-forming sector 134, a selection sector 136 and a DCT sector 138.

If the DCT_type information representing the progressive coding type is coupled to the shape re-forming sector 132 via the line L30, the shape re-forming sector 132 directly transfers the reconstructed shape information provided from the shape encoder 100 to the selection sector 136. On the other hand, the shape re-forming sector 132 provides re-formed shape information generated by re-forming the reconstructed shape information according to the interlaced coding technique to the selection sector 136 if the DCT_type information representing the interlaced coding type is inputted thereto.

Similarly, if the DCT_type information representing the progressive coding type is coupled to the texture re-forming sector 134 via the line L30, the texture re-forming sector 134 directly delivers the texture information coupled thereto to the selection sector 136. On the other hand, the texture re-forming sector 134 provides re-formed texture information produced by re-forming the texture information according to the interlaced coding technique to the selection sector 136 if the DCT_type information representing the interlaced coding type is inputted thereto.

In the above, if the DCT disable signal is fed to the shape and the texture re-forming sectors 132 and 134 via the line L30, the shape and the texture re-forming sectors 132 and 134 do not operate.

The selection sector 136 detects at least one non-transparent DCT-block among DCT-blocks in the progressive or the interlaced type macroblock corresponding to the processing macroblock based on the reconstructed or the re-formed shape information provided from the shape re-forming sector 132. Then, the selection sector 136 provides the texture or the re-formed texture information corresponding to each of the non-transparent DCT-blocks to the DCT sector 138.

The DCT sector 138 converts the texture or the re-formed texture information corresponding to each of the non-transparent DCT-blocks into a set of DCT coefficients and transfers the set of DCT coefficients to a quantization(Q) unit 140 in FIG. 1.

The Q unit 140 quantizes the set of DCT coefficients provided from the modified DCT unit 130 and provides a set of quantized DCT coefficients to a statistic encoding unit 150 and an AC component detection unit 160.

The statistic encoding unit 150 produces encoded texture information by compressing the set of quantized DCT coefficients derived from the Q unit 140 through the use of, e.g., a variable length coding technique, and provides the encoded texture information to the MUX 200.

Meanwhile, the AC component detection unit 160 checks whether there exists at least one non-zero AC component in the set of quantized DCT coefficients provided from the Q unit 140 and provides the check result to a CBPY generation unit 170.

If the check result represents that the set of quantized DCT coefficients contains at least one non-zero AC component therein, the CBPY generation unit 170 generates a CBPY bit, e.g., "1", for the set and, if otherwise, a CBPY bit, e.g., "0". If CBPY bits for all sets of DCT coefficients, i.e., all the non-transparent DCT-blocks, corresponding to the processing macroblock are decided through the above processes, the CBPY generation unit 170 provides the CBPY bits as CBPY information to a CBPY encoding unit 180 via a line L40.

For instance, in FIG. 4A, since both the progressive type macroblock P1 and its interlaced type macroblock I1 contain only non-transparent DCT-blocks, the corresponding CBPY information has 4-bit data regardless of the DCT_type of the processing macroblock.

On the other hand, in FIG. 4B, if the progressive type macroblock P2 is selected to be encoded, 2-bit CBPY information is generated and, if otherwise, 4-bit CBPY information is produced. In FIG. 4C, when the progressive type macroblock P3 is chosen to be encoded, 2-bit CBPY information is generated and, if otherwise, 1-bit CBPY information is produced.

Figure 6A:
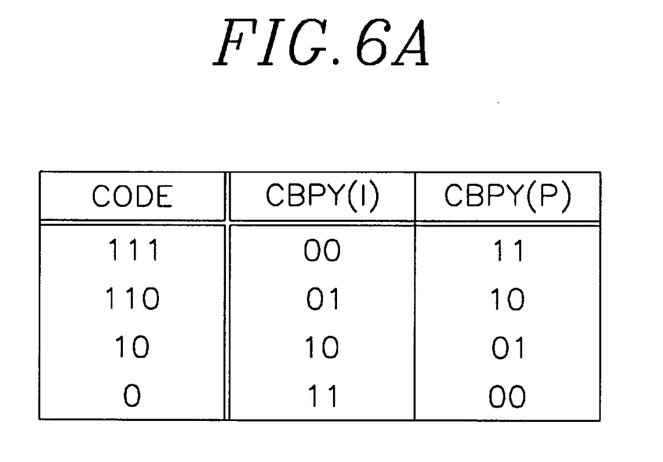
FIGS. 6A to 6C represent exemplary VLC tables for CBPY information, respectively.
Figure 6B:
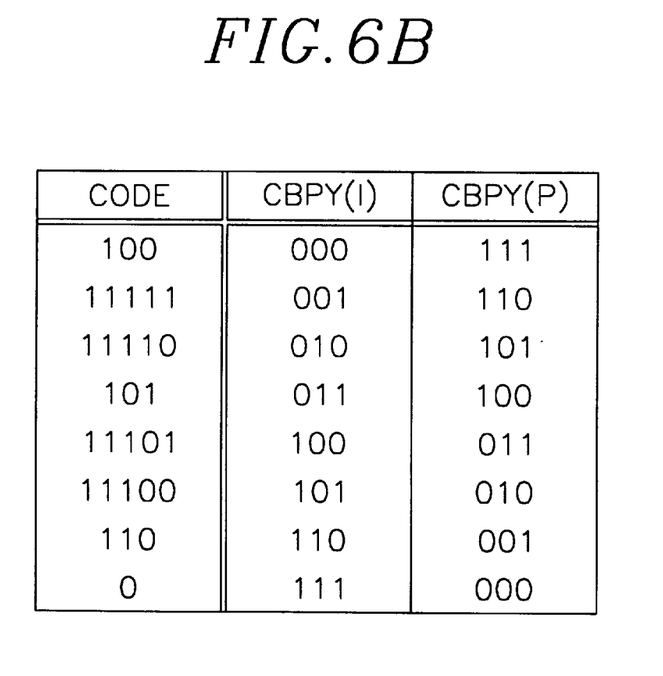
Figure 6C:
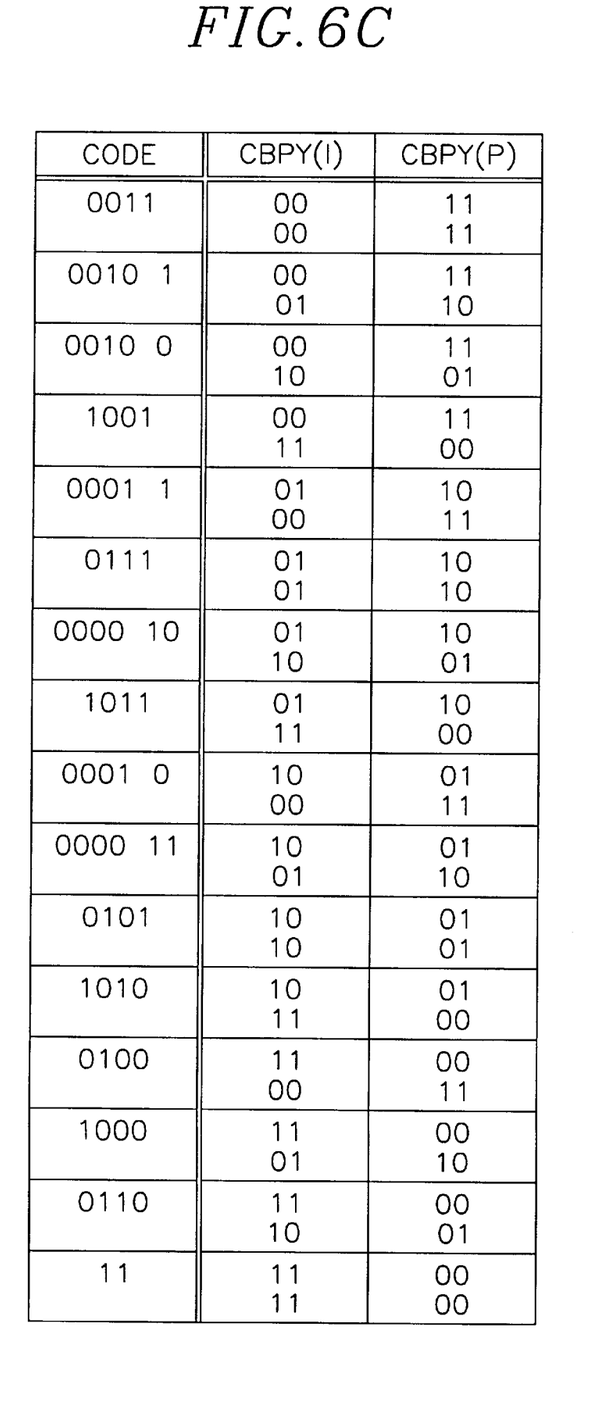

The CBPY encoding unit 180 finds a VLC code corresponding to the CBPY information transferred via the line L40 from the CBPY generation unit 170 among VLC tables stored at a VLC table unit 190 by using the predicted CBPY bit-number coupled thereto via the line L50 from the CBPY bit-number prediction unit 110 and provides the detected VLC code to the MUX 200 as encoded CBPY information, wherein the VLC table unit 190 includes various VLC tables predetermined depending on the bit-numbers of CBPY information and a frame type such as an I frame and a P frame as shown in FIGS. 6A to 6C.

Figure 3:
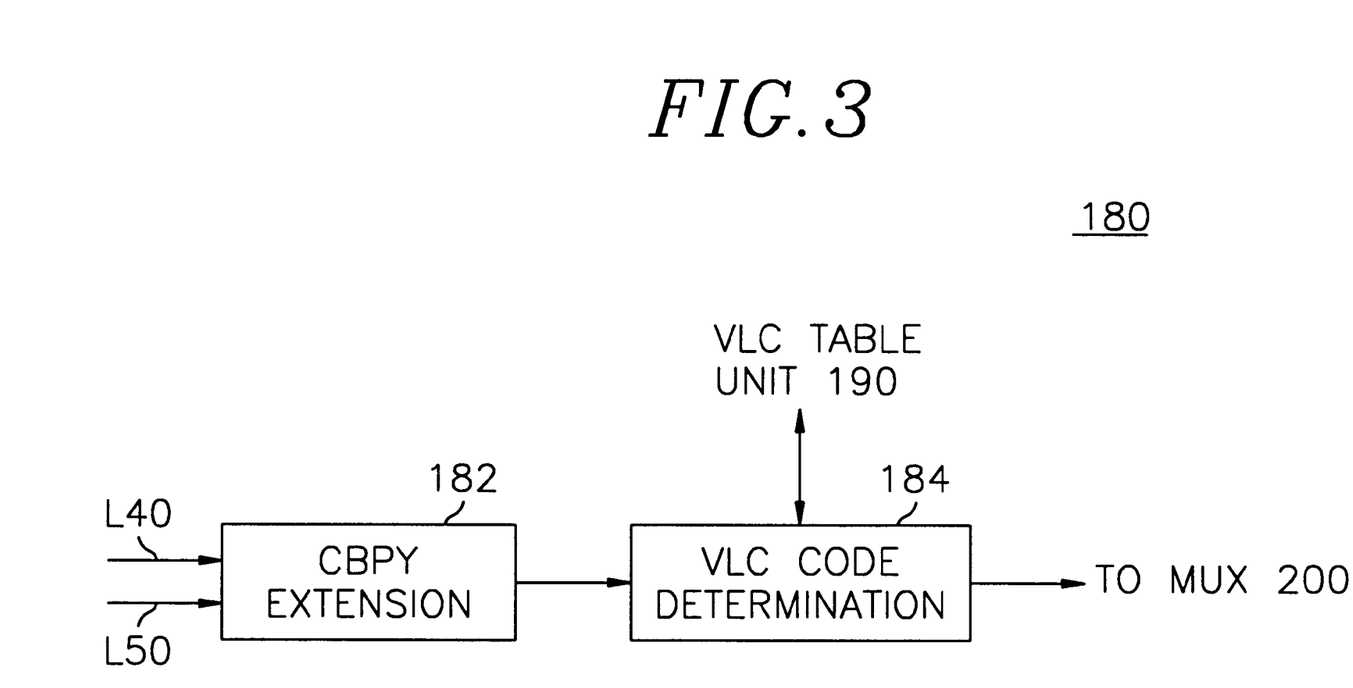
FIG. 3 provides a detailed block diagram of the CBPY encoding unit 180 in FIG. 1.

Referring to FIG. 3, there is provided a detailed block diagram of the CBPY encoding unit 180 in FIG. 1 in accordance with the embodiment of the present invention.

If the CBPY information and the predicted CBPY bit-number are coupled thereto via the lines L40 and L50, respectively, a CBPY extension sector 182 computes the bit-number of the CBPY information and, then, compares it with the predicted CBPY bit-number.

If the bit-number of the CBPY information is equal to the predicted CBPY bit-number, the CBPY extension sector 182 directly provides the CBPY information to a VLC code determination sector 184 without any process.

On the other hand, if the bit-number of the CBPY information is smaller than the predicted CBPY bit-number, the CBPY extension sector 182 produces extended CBPY information having a bit-number equal to the predicted CBPY bit-number by adding one or more dummy bits to the CBPY information, wherein the number of the dummy bits is given by a difference between the bit-number of the CBPY information and the predicted CBPY bit-number.

Hereinafter, the process performed at the CBPY extension sector 182 will be illustrated referring to FIGS. 4A to 4C.

Since the predicted CBPY bit-number is determined as the larger number between the numbers of non-transparent DCT-blocks in the progressive and the interlaced type macroblocks at the CBPY bit-number prediction unit 110, the predicted CBPY bit-numbers in FIGS. 4A to 4C are decided as 4, 4 and 2, respectively, as aforementioned.

Therefore, in FIG. 4A, as depicted above, the CBPY information is directly provided to the VLC code determination sector 184 since the bit-number of the CBPY information and its corresponding predicted CBPY bit-number are identical to each other, each being equal to 4, regardless of the DCT_type of the processing macroblock.

In contrast, in FIG. 4B, if the progressive type macroblock P2 is selected to be encoded, its CBPY information has 2-bits and its corresponding predicted CBPY bit-number is 4. Therefore, the CBPY extension sector 182 generates extended CBPY information of 4-bits by adding two dummy bits to the CBPY information of the 2-bits. On the other hand, if the interlaced type macroblock I2 is chosen, it will produce the CBPY information having the same bit-number as the predicted CBPY bit-number, i.e., 4. Accordingly, the CBPY information is directly supplied to the VLC code determination sector 184.

In FIG. 4C, if the progressive type macroblock P3 is chosen to be encoded, it will generate the CBPY information having the same bit-number as the predicted CBPY bit-number, i.e., 2, and the CBPY information is directly delivered to the VLC code determination sector 184 without being extended. On the other hand, if the interlaced type macroblock I3 is selected, since the CBPY information of a 1-bit is produced, the CBPY extension sector 182 generates extended CBPY information of 2-bits by adding one dummy bit to the CBPY information of the 1-bit.

Hereinafter, the bit extension process and the VLC code determination process being performed at the VLC code determination sector 184 will be described referring to FIGS. 6A to 6C.

As shown in FIG. 4B, when the CBPY information having 2-bits is changed to the extended CBPY information having 4-bits, the 2-bits in the CBPY information, e.g., 11, are left-positioned in the 4-bit sequence in accordance with the embodiment of the present invention. Therefore, the extended CBPY information having two dummy bits, i.e., "11XX", is inputted to the VLC code determination sector 184, wherein each "X" is a dummy bit and represents a "don't care".

The VLC code determination sector 184 determines a shortest VLC code among VLC codes corresponding to the extended CBPY information 11XX as encoded CBPY information of the processing macroblock.

For example, if the processing macroblock corresponds to an I frame, the VLC code determination sector 184 first detects VLC codes corresponding to the extended CBPY information 11XX among VLC codes in FIG. 6C which represents a VLC table containing VLC codes corresponding to CBPY information of 4-bits. That is, since the extended CBPY information 11XX can be read 1100, 1101, 1110 and 1111, VLC codes, i.e., 0100, 1000, 0110 and 11 are detected. Among the detected VLC codes, the shortest code, i.e., 11, is determined as the encoded CBPY information of the processing macroblock.

On the other hand, if the processing macroblock corresponds to a P frame, the VLC code determination sector 184 first detects VLC codes, i.e., 1001, 00100, 00101 and 0011, which correspond to the extended CBPY information 1100, 1101, 1110 and 1111, respectively. Among the detected VLC codes, there are two shorter VLC codes, i.e., 1100 and 1101, whose code lengths are identical to each other. In this case, any one of the two shorter VLC codes can be determined as the encoded CBPY information of the processing macroblock.

Similarly, in FIG. 4C, when the CBPY information having 1-bit is converted to extended CBPY information having 2-bits, the 1-bit in the CBPY information, e.g., 0, is left-positioned in the 2-bit sequence as well as in the former example. Consequently, the extended CBPY information having one dummy bit, i.e., "0X", is inputted to the VLC code determination sector 184.

If the processing macroblock corresponds to the I frame, the VLC code determination sector 184 detects VLC codes corresponding to the extended CBPY information 0X among VLC codes in FIG. 6A which represents a VLC table containing VLC codes corresponding to CBPY information of 2-bits. That is, since the extended CBPY information 0X can be read 00 and 01, VLC codes, i.e., 111 and 110 are detected. As in the former example, since the detected two VLC codes also have same code lengths, any one of the two VLC codes can be determined as the encoded CBPY information of the processing macroblock.

Alternatively, if the processing macroblock corresponds to the P frame, the VLC code determination sector 184 detects VLC codes, i.e., 0 and 10, which correspond to the extended CBPY information 00 and 01, respectively. Among the detected VLC codes, the shortest code, i.e., 0, is determined as the encoded CBPY information of the processing macroblock.

In the above cases, although the bits of the CBPY information are left-positioned in the extended sequence, their locations can be changed in accordance with another embodiment of the present invention. Furthermore, the above bit extension process can be applied to any CBPY information which need be extended.

The encoded CBPY information generated above is inputted to the MUX 200.

The MUX 200 multiplexes the DCT_type information, the encoded texture information, the encoded CBPY information and the encoded shape information fed thereto and provides a data stream for the processing macroblock in a sequence described in FIG. 5 to a transmitter(not shown) for the transmission thereof.

If the encoded information is transmitted to a decoding part in the sequence described in FIG. 5, a video signal decoder first decodes the encoded shape information to thereby generate reconstructed shape information. If the reconstructed shape information is produced, the decoder can predict the bit-number of the CBPY information, i.e., the number of non-transparent DCT-blocks in the processing macroblock, by detecting the numbers of non-transparent blocks in the progressive and the interlaced type macroblocks corresponding to the processing macroblock based on the reconstructed shape information and comparing them with each other.

As a result of the above comparison, if the bit-number of the CBPY information is determined as 4, the decoder then finds CBPY information corresponding to the encoded CBPY information, i.e., the VLC code determined at the video encoder 10, among VLC codes in FIG. 6C. If CBPY information, e.g., 1100, is obtained, it is maintained until the DCT_type information is transmitted.

If the transmitted DCT_type information represents the progressive coding type and the number of the non-transparent DCT-blocks in the progressive type macroblock corresponding to the processing macroblock is, e.g., 2, the right-positioned two bits, i.e., 00, in the above CBPY information 1100 is eliminated as invalid bits and the CBPY information is reconstructed as 11.

Consequently, although the DCT_type information follows the CBPY information as shown in the data stream having the sequence shown in FIG. 5, the decoder can reconstruct the CBPY information without errors.

In the first and the second embodiments of the present invention, it should be apparent to those having ordinary skill in the art that the shape information to be encoded can be used in lieu of the reconstructed shape information.

While the present invention has been described with respect to certain preferred embodiments only, other modifications and variations may be made without departing from the spirit and scope of the present invention as set forth in the following claims.

What is claimed is:

1. A method, for use in a video signal encoder for encoding a video signal by selectively using either a progressive or an interlaced coding technique, for coding texture information of the video signal which includes texture information and shape information on each of macroblocks, each macroblock having M×M pixels and being dividable into P number of equal-sized DCT-blocks, M and P being positive integers, respectively, comprising the steps of:

(a) generating a predicted coded block pattern type (CBPY) bit-number based on the shape information on a target macroblock, wherein the predicted CBPY bit-number is determined as the larger of the number of non-transparent DCT-blocks in progressive macroblocks and the number of non-transparent DCT-blocks in interlaced type macroblocks, the progressive and the interlaced type macroblocks being generated by re-forming the shape information on the target macroblock according to the progressive and the interlaced coding techniques, respectively, interlaced type macroblocks including top-field and bottom-field DCT blocks, each comprising alternating rows of corresponding progressive type macroblocks, each non-transparent DCT-block having a DCT-block size and containing at least one object pixel;

(b) determining which of the progressive coding technique and the interlaced coding technique is more effective at encoding texture information in the target macroblock, to thereby form DCT_type information representing the DCT_type;

(c) converting the texture information on the target macroblock in response to the DCT_type to thereby produce transformed texture information;

(d) producing CBPY information for the target macroblock based on the transformed texture information;

(e) encoding the CBPY information by performing a bit extension process based on the predicted CBPY bit-number to thereby provide encoded CBPY information; and (f) encoding the transformed texture information to thereby supply encoded texture information.

2. A method, for use in a video signal encoder for encoding a video signal by selectively using either a progressive or an interlaced coding technique, for coding texture information of the video signal which includes the texture information and shape information on each of macroblocks, each macroblock having M×M pixels and being dividable into P number of equal-sized DCT-blocks, M and P being positive integers, respectively, comprising the steps of:

(a) generating a predicted coded block pattern type (CBPY)bit-number based on the shape information on a target macroblock, wherein the predicted CBPY bit-number is determined as the larger of the number of non-transparent DCT-blocks in progressive macroblocks and the number of non-transparent DCT-blocks in interlaced type macroblocks, the progressive and the interlaced type macroblocks being generated by re-forming the shape information on the target macroblock according to the progressive and the interlaced coding techniques, respectively, each non-transparent DCT-block having a DCT-block size and containing at least one object pixel;

(b) determining which of the progressive coding technique and the interlaced coding technique is more effective at encoding texture information in the target macroblock, to thereby form DCT_type information representing the DCT_type;

(c) converting the texture information on the target macroblock in response to the DCT_type to thereby produce transformed texture information;

(d) producing CBPY information for the target macroblock based on the transformed texture information;

(e) encoding the CBPY information by performing a bit extension process based on the predicted CBPY bit-number to thereby provide encoded CBPY information; and (f) encoding the transformed texture information to thereby supply encoded texture information, wherein the step (e) includes the steps of:

(e1) comparing the bit-number of the CBPY information and the predicted CBPY bit-number;

(e2) providing the CBPY information if the bit-number of the CBPY information is identical to the predicted CBPY bit-number, thereby providing the encoded CBPY information;

(e3) producing extended CBPY information having a bit-number equal to the predicted CBPY bit-number by adding one or more dummy bits to the CBPY information if the bit-number of the CBPY information is different from the predicted CBPY bit-number, wherein each dummy bit can be any one of binary values and the number of the dummy bits is given by a difference between the bit-number of the CBPY information and the predicted CBPY bit-number; and (e4) encoding either the CBPY information provided from the step (e2) or the extended CBPY information in conformity with the results of the step (e1), thereby providing the encoded CBPY information.

3. The method according to claim 2, wherein either the CBPY information or the extended CBPY information is encoded through the use of a variable length coding technique.

4. The method according to claim 3, wherein, if the extended CBPY information is encoded at the step (e4), the step (e4) detects a VLC code whose length is shortest among VLC codes corresponding to the extended CBPY information and provides the detected VLC code as the encoded CBPY information for the target macroblock.

5. The method according to claim 4, wherein the step (c) includes the steps of:

(c1) re-forming the texture information and the shape information in response to the DCT_type;

(c2) detecting one or more non-transparent DCT-blocks for the target macroblock based on the re-formed shape information;

(c3) converting the re-formed texture information corresponding to each of the non-transparent DCT-blocks into a set of DCT coefficients;

(c4) quantizing the set of DCT coefficients to thereby produce a set of quantized DCT coefficients; and (c5) providing the sets of quantized DCT coefficients for all of the non-transparent DCT-blocks as the transformed texture information.

6. The method according to claim 5, wherein the step (d) includes the steps of:

(d1) checking whether there exists at least one non-zero AC component in each of the sets of quantized DCT coefficients in the transformed texture information; and (d2) producing the CBPY information having i-bit data, i being a positive integer ranging from 1 to P, each bit representing whether a corresponding set of quantized DCT coefficients contains at least one non-zero AC component therein in conformity with the results of the step (d1).

7. The method according to claim 6 further comprising, prior to the step (a), the step of producing encoded shape information by encoding input shape data on the target macroblock and generating the shape information on the target macroblock by decoding the encoded shape information.

8. The method of claim 7 further comprising the step of supplying a data stream to be transmitted which contains encoded information in sequence of the encoded shape information, the encoded CBPY information, the DCT_type information and the encoded texture information.

9. An apparatus for coding a video signal which includes texture information and shape information on each of macroblocks by selectively using either a progressive or an interlaced coding technique, each macroblock having M×M pixels and being dividable into P number of equal-sized DCT-blocks, M and P being positive integers, respectively, comprising:

means for producing encoded shape information by encoding the shape information on a target macroblock and generating reconstructed shape information by decoding the encoded shape information;

means for generating a predicted coded block pattern type (CBPY) bit-number based on the reconstructed shape information on the target macroblock, wherein the predicted CBPY bit-number is determined as the larger of the number of non-transparent DCT-blocks in progressive macroblocks and the number of non-transparent DCT-blocks in interlaced type macroblocks, the progressive and the interlaced type macroblocks being generated by re-forming the reconstructed shape information on the target macroblock according to the progressive and the interlaced coding techniques, respectively, each non-transparent DCT-block having a DCT-block size and containing at least one object pixel;

means for determining which of the progressive coding technique and the interlaced coding technique is more effective at encoding texture information in the target macroblock, to thereby form DCT_type information representing the DCT_type;

means for converting the texture information on the target macroblock in response to the DCT_type to thereby produce transformed texture information;

means for producing CBPY information for the target macroblock based on the transformed texture information;

means for encoding the CBPY information by performing a bit extension process based on the predicted CBPY bit-number to thereby provide encoded CBPY information; and means for encoding the transformed texture information to thereby supply encoded texture information, wherein the CBPY information encoding means includes:

means for comparing the bit-number of the CBPY information and the predicted CBPY bit-number, to thereby provide either the CBPY information or extended CBPY information which is generated to have a bit-number equal to the predicted CBPY bit-number; and means for encoding either the CBPY information or the extended CBPY information, thereby providing the encoded CBPY information.

10. The apparatus as recited in claim 9, wherein the comparing means contains:

means for comparing the bit-number of the CBPY information and the predicted CBPY bit-number;

means for providing the CBPY information if the bit-number of the CBPY information is identical to the predicted CBPY bit-number; and means for producing the extended CBPY information having a bit-number equal to the predicted CBPY bit-number by adding one or more dummy bits to the CBPY information if the bit-number of the CBPY information is different from the predicted CBPY bit-number, wherein each dummy bit can be any one of binary values and the number of the dummy bits is given by a difference between the bit-number of the CBPY information and the predicted CBPY bit-number.

11. The apparatus as recited in claim 10, wherein either the CBPY information or the extended CBPY information is encoded through the use of a variable length coding technique.

12. The apparatus as recited in claim 11, wherein, if the extended CBPY information is encoded, a VLC code whose length is shortest among VLC codes corresponding to the extended CBPY information is detected and provided as the encoded CBPY information for the target macroblock.

13. The apparatus as recited in claim 12, wherein the texture information converting means includes:

means for re-forming the texture information and the reconstructed shape information in response to the DCT_type;

means for detecting one or more non-transparent DCT-blocks for the target macroblock based on the re-formed shape information;

means for converting the re-formed texture information corresponding to each of the non-transparent DCT-blocks into a set of DCT coefficients;

means for quantizing the set of DCT coefficients to thereby produce a set of quantized DCT coefficients; and means for providing the sets of quantized DCT coefficients for all of the non-transparent DCT-blocks as the transformed texture information.

14. The apparatus as recited in claim 13, wherein the CBPY information producing means includes:

means for checking whether there exists at least one non-zero AC component in each of the sets of quantized DCT coefficients in the transformed texture information; and means for producing the CBPY information having i-bit data, i being a positive integer ranging from 1 to P, each bit representing whether a corresponding set of quantized DCT coefficients contains at least one non-zero AC component therein.

15. The apparatus as recited in claim 14 further comprising means for providing a data stream to be transmitted which contains encoded information in sequence of the encoded shape information, the encoded CBPY information, the DCT_type information and the encoded texture information.

* * * * *